(12) United States Patent
Cho

(10) Patent No.: US 6,219,230 B1
(45) Date of Patent: Apr. 17, 2001

(54) PORTABLE COMPUTER WITH IMPROVED ASSEMBLY DESIGN

(75) Inventor: Jeong-Seop Cho, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/451,933

(22) Filed: Dec. 1, 1999

(30) Foreign Application Priority Data

Dec. 1, 1998 (KR) .................................................. 98-24247

(51) Int. Cl.[7] ................................. G06F 1/16; H05K 7/00
(52) U.S. Cl. .......................... 361/683; 312/223.2; 16/342
(58) Field of Search .................................... 361/683, 681, 361/679–686, 724–727; 312/223.1, 223.2; 16/306, 307, 342

(56) References Cited

U.S. PATENT DOCUMENTS

| | | |
|---|---|---|
| 5,036,313 | 7/1991 | Lin et al. . |
| 5,175,672 | 12/1992 | Conner et al. . |
| 5,214,574 | 5/1993 | Chang . |
| 5,345,362 | 9/1994 | Winkler . |
| 5,422,784 * | 6/1995 | Wakahara et al. ................... 361/680 |
| 5,467,504 | 11/1995 | Yang . |
| 5,483,418 | 1/1996 | Hosoi . |
| 5,498,165 | 3/1996 | Tseng . |
| 5,566,048 | 10/1996 | Esterberg et al. . |
| 5,689,400 | 11/1997 | Ohgami et al. . |
| 5,715,139 * | 2/1998 | Nakajima .............................. 361/683 |
| 5,786,984 | 7/1998 | Bonardi et al. . |
| 5,796,575 | 8/1998 | Podwalny et al. . |
| 5,796,576 * | 8/1998 | Kim ..................................... 361/681 |
| 5,844,772 * | 12/1998 | Lee et al. ............................. 361/683 |
| 5,933,321 | 8/1999 | Ruch et al. . |

* cited by examiner

Primary Examiner—Leo P. Picard
Assistant Examiner—Lisa Lea-Edmonds
(74) Attorney, Agent, or Firm—Robert E. Bushnell, Esq.

(57) ABSTRACT

The present invention relates to a portable computer having a base and a display panel coupled by a hinge structure. The base has a bottom and a top housing. The bottom housing has bottom bosses with holes extending upwardly. A circuit board has holes aligned with the bottom housing holes. The top housing also has holes aligned with the bottom housing. A top housing is coupled to the circuit board and the bottom housing. A display panel incorporating a display screen is attached pivotally to the top housing with a hinge assembly. The hinge assembly has holes aligned with the holes of the bottom housing. A pair of caps are coupled to the top housing to cover the hinge assembly. Each cap has a boss with a hole aligned with the hole of the bottom. A screw is inserted from outside the bottom housing and through the circuit board, the top housing, the hinge assembly, and finally coupling with the cap boss. A single set of screws attach the base portions and pivotally attaches the display panel with the base.

20 Claims, 7 Drawing Sheets

PORTABLE COMPUTER WITH IMPROVED ASSEMBLY DESIGN

CLAIM OF PRIORITY

This application makes reference to, incorporates the same herein, and claims all benefits accruing under 35 U.S.C. §119 from an application entitled *Portable Computer with Improved Assembly Design* earlier filed in the Korean Industrial Property Office on Dec. 1, 1998, and there duly assigned Ser. No. 98-24247 by that Office.

BACKGROUND OF THE INVENTION

1. Field of the Invention

The present invention relates to a portable computer and, more particularly to a portable computer having a base and a display panel coupled by a hinge structure.

2. Background of the Invention

Beginning in the mid-1980's, portable computers, alternatively known as laptops, notebook computers, palmtops, and personal digital assistants (PDA), have expanded in popularity and at an astonishing rate. Such computers are lightweight and have a display screen supported by a hinged cover that protects the keyboard and display screen when the computer is not being operated.

Laptops and notebook computers are, as their name implies, generally the size of an average sized book and will generally fit on a person's lap. While on the lap, the computer can be comfortably operated. Both laptops and notebooks have their own rechargeable battery power supply as well as a connector for an outside alternating current power source. Laptops and notebooks will generally include a hard drive as a storage memory and sometimes a floppy disk drive and a compact disc drive. They will always have a liquid crystal display, an input device such as a keyboard, and a microprocessor.

Palmtops are usually a little smaller than their laptop counterparts. As their name implies, palmtops are small enough to fit on a users palm. They can also be comfortably operated while resting on one hand. The palmtops generally have less random access memory and sometimes slower microprocessors than the laptops or notebooks. Because of the smaller size limitations, a compact disc drive is sometimes not included. They will always have a liquid crystal display, an input device such as a keyboard, and a microprocessor.

Personal digital assistants are usually smaller than palmtops, laptops, or notebook computers. Most often, personal digital assistants will fit into a user's pocket. The PDA can rest one hand and be comfortably operated by another hand. However, because of the size reduction, the random access memory and storage memory are usually smaller than palmtops, laptops, or notebooks. They will always have a liquid crystal display, an input device such as a keyboard or pen input device, and a microprocessor. Because of a PDA's smaller battery, the processor is also generally slower than the other portable computers. Personal Digital Assistants, because of their memory constrictions often have a different operating system than the other larger portable computers. Personal Digital Assistants are generally used to keep track of a user's daily schedule. The PDA will have at least a database for names and addresses of people, places or companies. However, because of the increasing memory and processor speed, personal digital assistants are also being used for retrieving electronic mail and web browsing that are similar to the other portable computers, but with a smaller video display screen.

A conventional portable computer assembly includes a display panel hinged to the rear edge of the base using a hinge shaft and hollow ridges. The display panel houses a flat panel display screen such as an LCD (Liquid Crystal Display). The base has an upper housing coupled with a lower housing. The upper housing supports a keyboard assembly. The base stores electronic components such as a printed circuit board, hard drive and sometimes a floppy drive and a compact disc drive. Electronic parts such as a microprocessor and memory are mounted on the printed circuit board. The printed circuit board is attached to the lower housing using fasteners such as screws.

Because separate sets of fasteners are used to connect the circuit board to the lower housing, the lower housing to the upper housing and the display panel to the base, a long time is required for the assembly of the portable computer, thereby reducing production efficiency. Furthermore, because the space available for electronic components is so important in a portable computer, unnecessary internal space is taken up by the separate sets of fasteners and the molded housing used to support such separate fasteners.

An exemplar of the prior art Lin et al (U.S. Pat. No. 5,036,313, *Portable Computer with Improved Assembly Design*, July 1991) discusses a portable computer housing assembly. The upper housing is connected to the lower housing using fasteners inserted though a bosses molded on the lower housing. A separate rail molding allowing for the printed circuit board to slide in is used. The rails take up more space need for electronic parts. With a separate set of fasteners, the display panel is hinged to the upper housing.

Hosoi (U.S. Pat. No. 5,483,418, *Portable Electronic Apparatus Having a Keyboard with a Shielding Plate Attached to a Cover Thereof*, January 1996) discusses a portable computer assembly. A keyboard is hooked into the upper housing. The upper housing is connected to the lower housing with a set of screws. A separate set of screws are used to connect the base with the display panel.

Esterberg et al (U.S. Pat. No. 5,566,048, *Hinge Assembly for a Device Having a Display*, Oct. 15, 1996) discloses a hinge assembly for a portable computer. One screw is used to connect the base with the hinge assembly. Then a separate screw is used to connect just the hinge assembly with the display panel.

Tseng et al (U.S. Pat. No. 5,498,165, *Combined Hinge and Electrical Connector for Portable Computer*, March 1996) discloses a hinge assembly attaching the display panel with the base of a portable computer. A separate screw is used just to attach the hinge to the base and another screw is used to connect a plate of the hinge to the display. Separate fasteners are used to connect the rest of the computer assembly.

Bonardi et al. (U.S. Pat. No. 5,786,984, *Modular Portable Personal Computer*, July 1998), Winkler (U.S. Pat. No. 5,345,362, *Portable Computer Apparatus with Articulating Display Panel*, September 1994), Ohgami et al. (U.S. Pat. No. 5,689,400, *Portable Electronic Apparatus Including Space-saving Component Mounting Features*, November 1997), Chang (U.S. Pat. No. 5,214,574, *Portable Computer Housing in Combination with a Portable Computer*, May 1993), Conner et al (U.S. Pat. No. 5,175,672, *Housing Apparatus for Portable Computer Systems*, December 1992), Podwalny et al (U.S. Pat. No. 5,796,575, *Portable Computer with Hinged Cover having a Window*, August 1998), Yang (U.S. Pat. No. 5,467,504, *Hinge for a Portable Computer*, November 1995) are exemplar art.

SUMMARY OF THE INVENTION

It is therefore an object of the present invention to provide a portable computer with an improved assembly design.

It is also an object to provide a portable computer assembly that is easier and quicker to put together.

It is another object to have fewer steps in assembling a portable computer.

It is a further object to have fewer fastening parts used in assembling a portable computer.

It is another object to save internal space of the portable computer by having less area taken away by the fasteners and the housing attachments used to support such fasteners.

In order to attain the above objects, according to an aspect of the present invention, there is provided a portable computer housing assembly having a display panel, an upper housing, a printed circuit board and a lower housing. The display panel contains a flat panel display screen. The upper housing has a keyboard assembly. The bottom housing has at least one boss with a hole extending upwardly. The top housing has at least one hole formed on the same vertical line as at least one boss. A display panel incorporating a display screen is attached pivotally to the top housing and having a hinge portion provided with at least one hole formed on vertically the same line as the hole of at least one bottom boss. At least one cap is coupled to the top housing to cover the hinge portion and having at least one cap boss formed on vertically the same line as the hole of at least one bottom boss. At least one coupling member is inserted from outside of the bottom housing, where at least one coupling member is passed through the hole of at least one bottom boss. The hole of the top housing and the hole of the hinge portion, then is coupled to at least one cap boss to fix the bottom housing, the top housing, the display panel and at least one cap.

The portable computer further includes a printed circuit board that has at least one hole formed on vertically the same line as at least one of the bottom boss holes and is located between the bottom housing and the top housing to be fixed by at least one coupling member.

Furthermore, at least one cap includes a first lug spaced from at least one cap boss. A second lug is formed perpendicular to the first lug and spaced from at least one cap boss.

The top housing further includes a first seat coupled to the first lug to fix at least one cap on the top housing. A second seat is coupled to the second lug to fix at least one cap on the top housing.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 1:
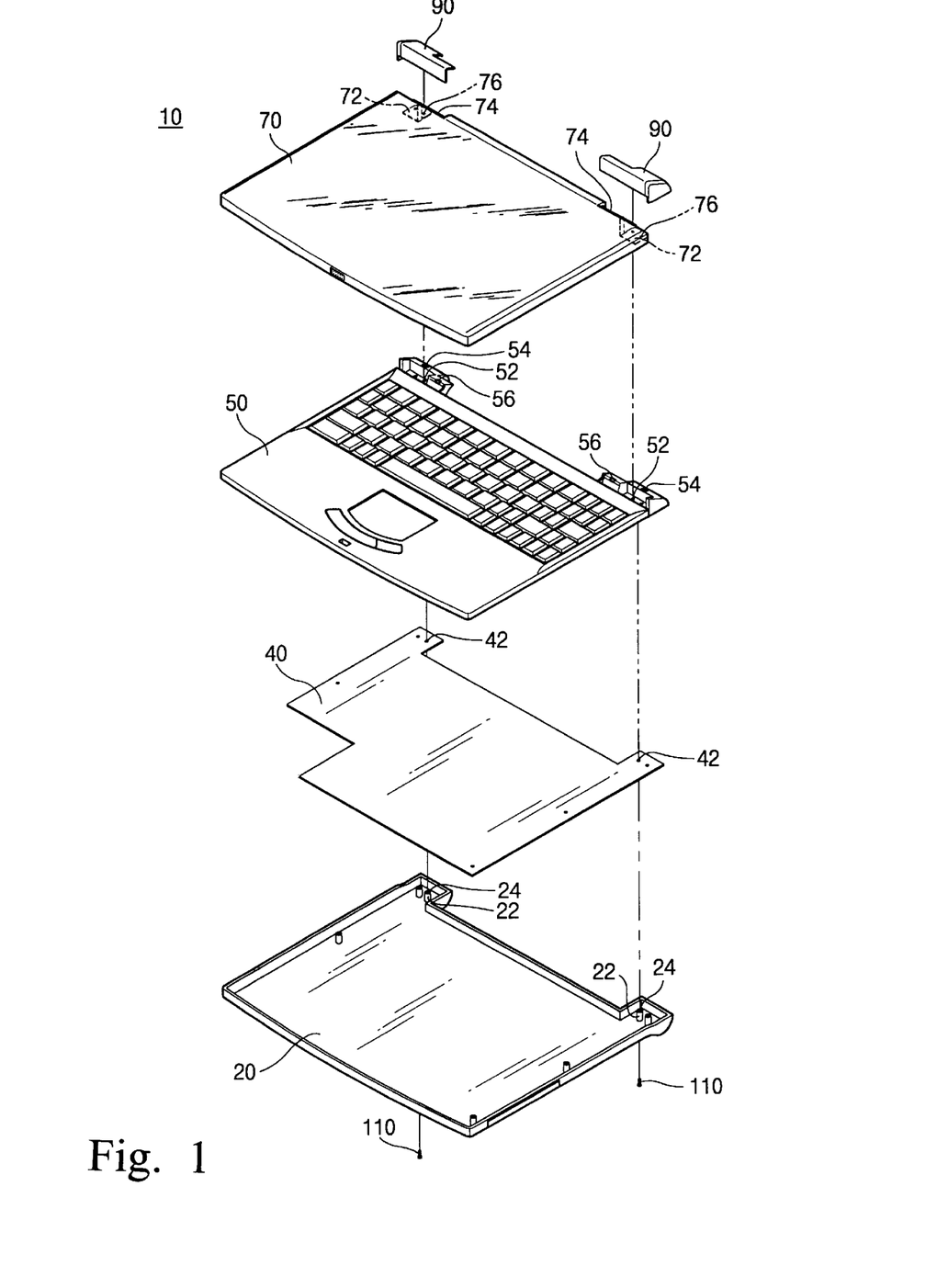
FIG. 1 is an exploded perspective view for illustrating a portable computer according to the present invention.
Figure 2:
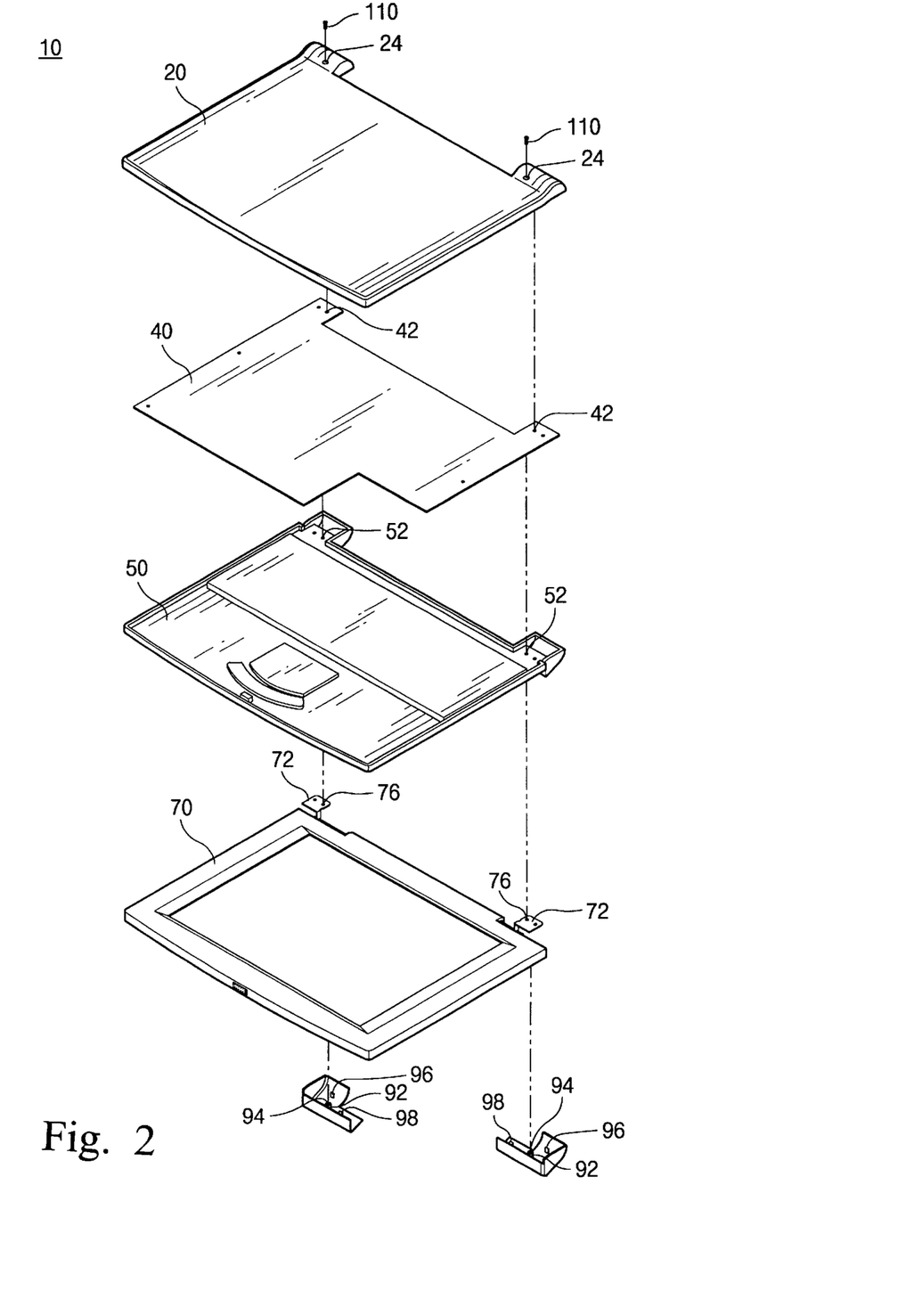
FIG. 2 is an exploded perspective view for illustrating a portable computer according to the present invention looking toward the bottom of the portable computer.
Figure 3:
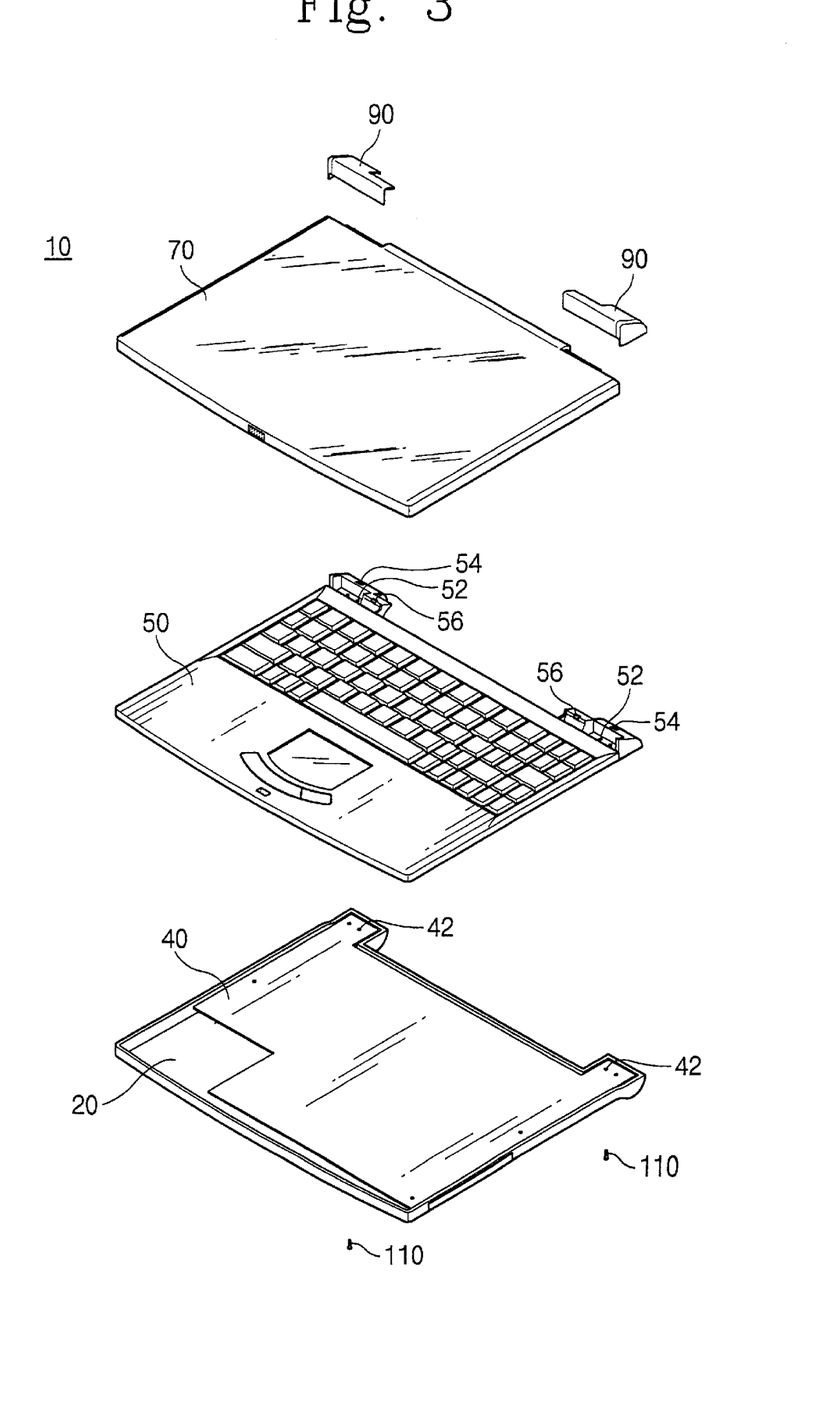
FIG. 3–FIG. 6 are perspective views for illustrating a combining process of the portable computer of FIG. 1.

Referring now to the drawings and particularly to FIGS. 1 and 2, a portable computer 10 according to the present invention includes a lower housing 20 (or a bottom housing), a printed circuit board 40, an upper housing 50 (or a top housing), a display panel 70 and caps 90. The lower housing 20 and the upper housing 50 is coupled to provide an internal space. In the internal space formed by the coupling of the lower housing 20 and the upper housing 50, the printed circuit board 40 is disposed. The combination of the lower housing 20 and the upper housing 50 is often called a base or a main body of the portable computer 10. The display panel or cover 70 incorporating a display screen such as an LCD is pivotally attached to the rear edge of the upper housing 50. At the rear edge of the upper housing 50, a hinge unit is formed. The hinge unit enables the display panel 70 to be moved pivotally.

Figure 7:
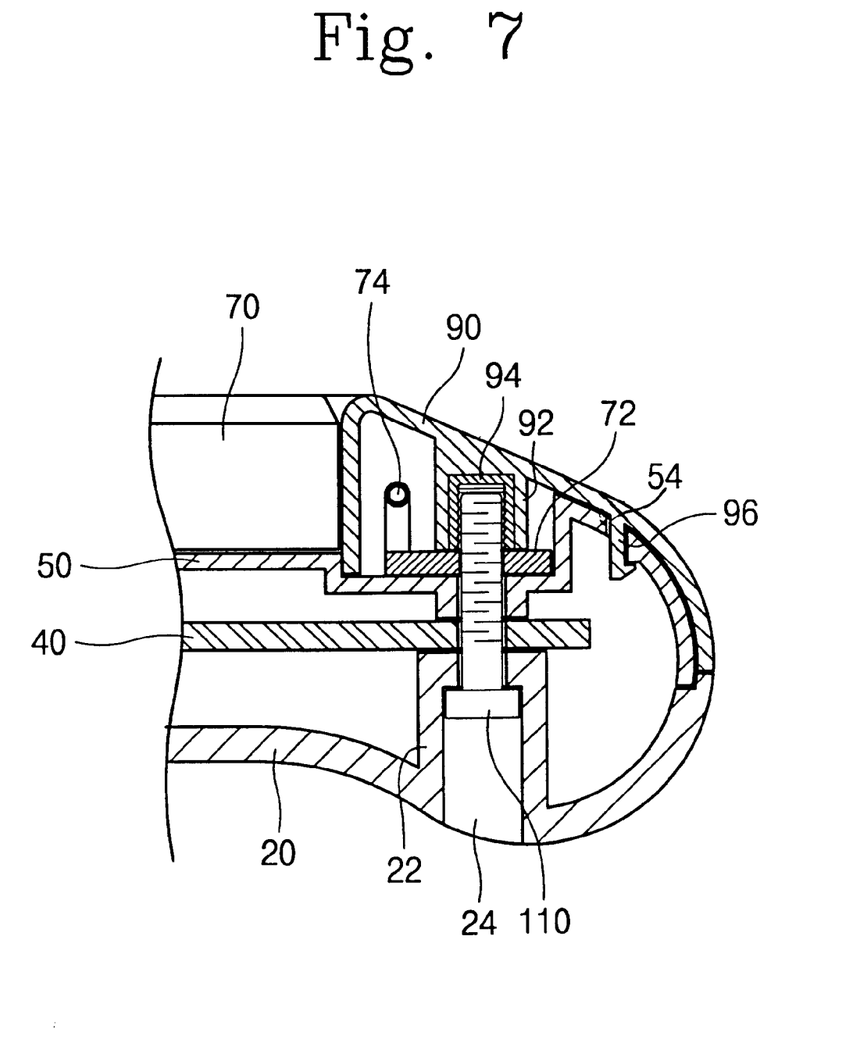
FIG. 7 is a cross-sectional view taken along a line 7—7 of FIG. 6.

In the embodiment of the present invention with the improved assembly design, the lower housing 20, the printed circuit board 40, the upper housing 50, the display panel 70 and the caps 90 are coupled by screws 110. The screws 110 are of the same type. The coupling portions of the above elements mentioned have to be located on vertically the same line. On the lower housing 20, bottom bosses 22 having a hole 24 are formed to be extended outwardly. As shown in FIGS. 2 and 7, the screw 110 is inserted into the hole 24 of the bottom bosses 22. In this state, a head of screw 110 is located within the bottom bosses 22. The printed circuit board 40 and the upper housing 50 have holes 42, 52 formed on the same vertical line as hole 24 of the lower housing 22. The display panel 70 has the hinge portion to be coupled to the rear edge of the upper housing 50, which includes a hinge shaft 74 and a pair of hinge plates 72 shown in FIG. 1. The hinge plates 72 each have a protrusion at a corner. The hinge shaft 74 makes the display panel 70 to be moved pivotally, and the hinge plates 72 are fixed on the upper housing 50 to support the hinge shaft 74. Each one of the hinge plates 72 has a hole 76 disposed on the same vertical line as hole 24 of the bottom bosses 22. Each one of the caps 90 has a cap-boss 92, which is provided with insert 94 formed within each of the cap-bosses 92. The insert 94 is made of the metal material, then the screw 110 is securely coupled to the cap-boss 92. Therefore, the screw 110 is inserted into the bottom boss 22 and passed through the lower housing 20, the printed circuit board 40, the upper housing 50, the display panel 70, finally is coupled to the cap-boss 92.

The cap 90 has two lugs (alternatively tines with detents at the end portion) 96,98 spaced from the cap boss 92. The lugs 96, 98 are at right angle to each other. Seats 54, 56 are formed at the rear edge of the upper housing 50 and combined with the lugs 96,98. The coupling of the lugs and the seats makes the caps 90 fixed on the upper housing 50. Even when the screws 110 are separated or combined, the caps 90 coupled on the upper housing 50 is not moved.

Figure 4:
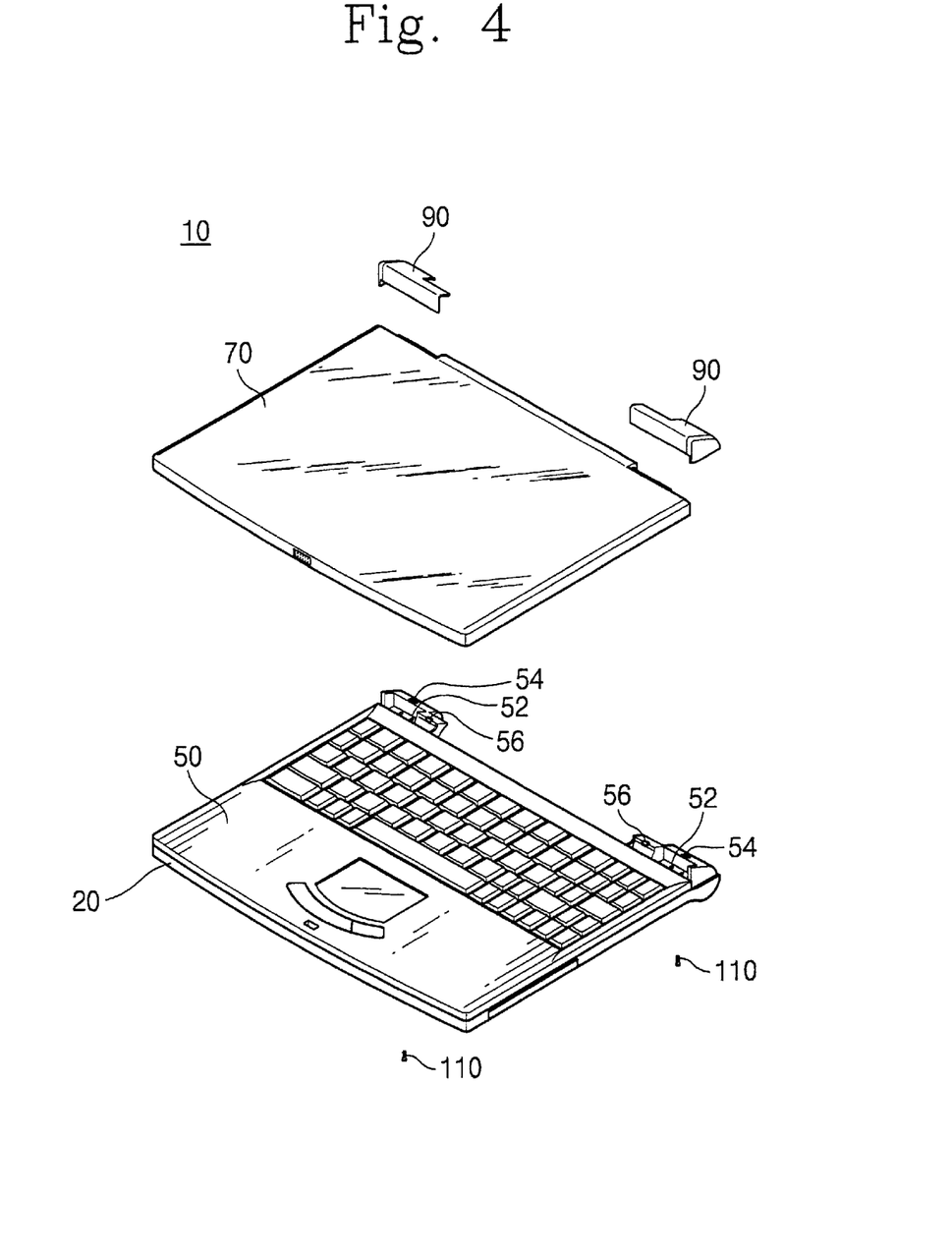
Figure 5:
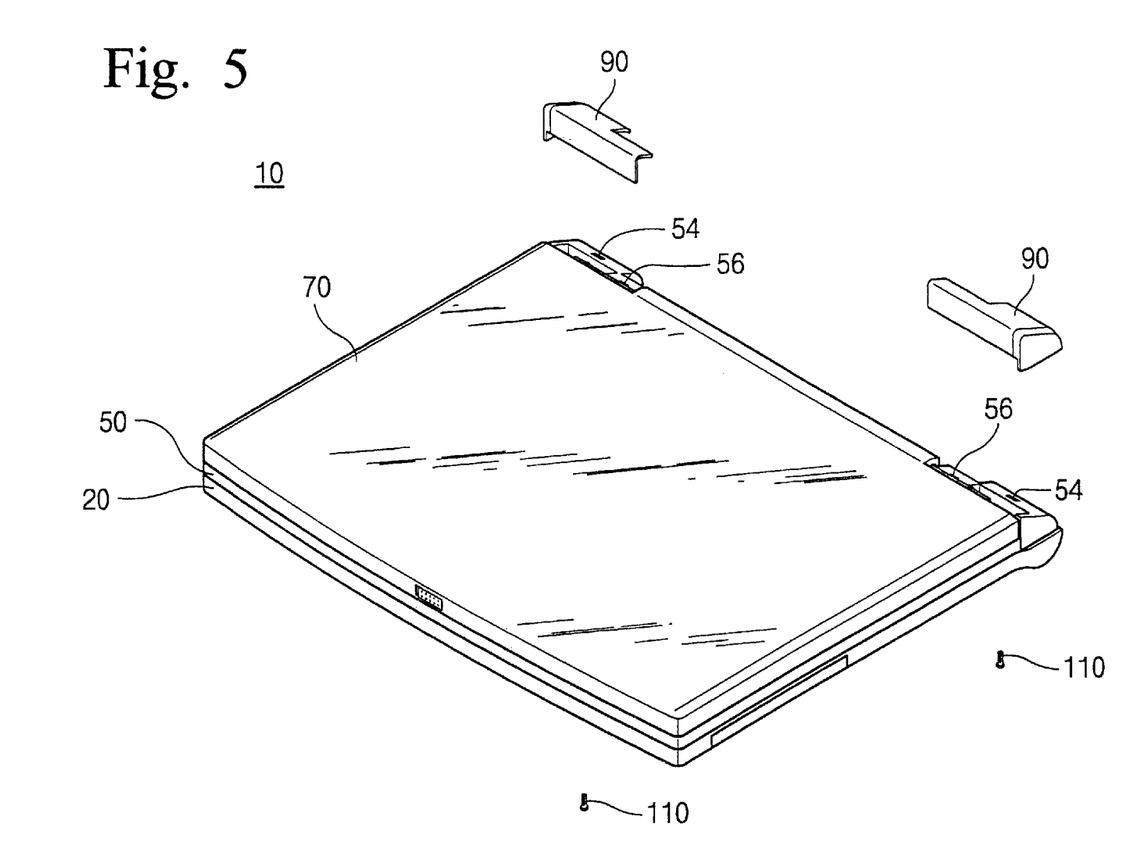
Figure 6:
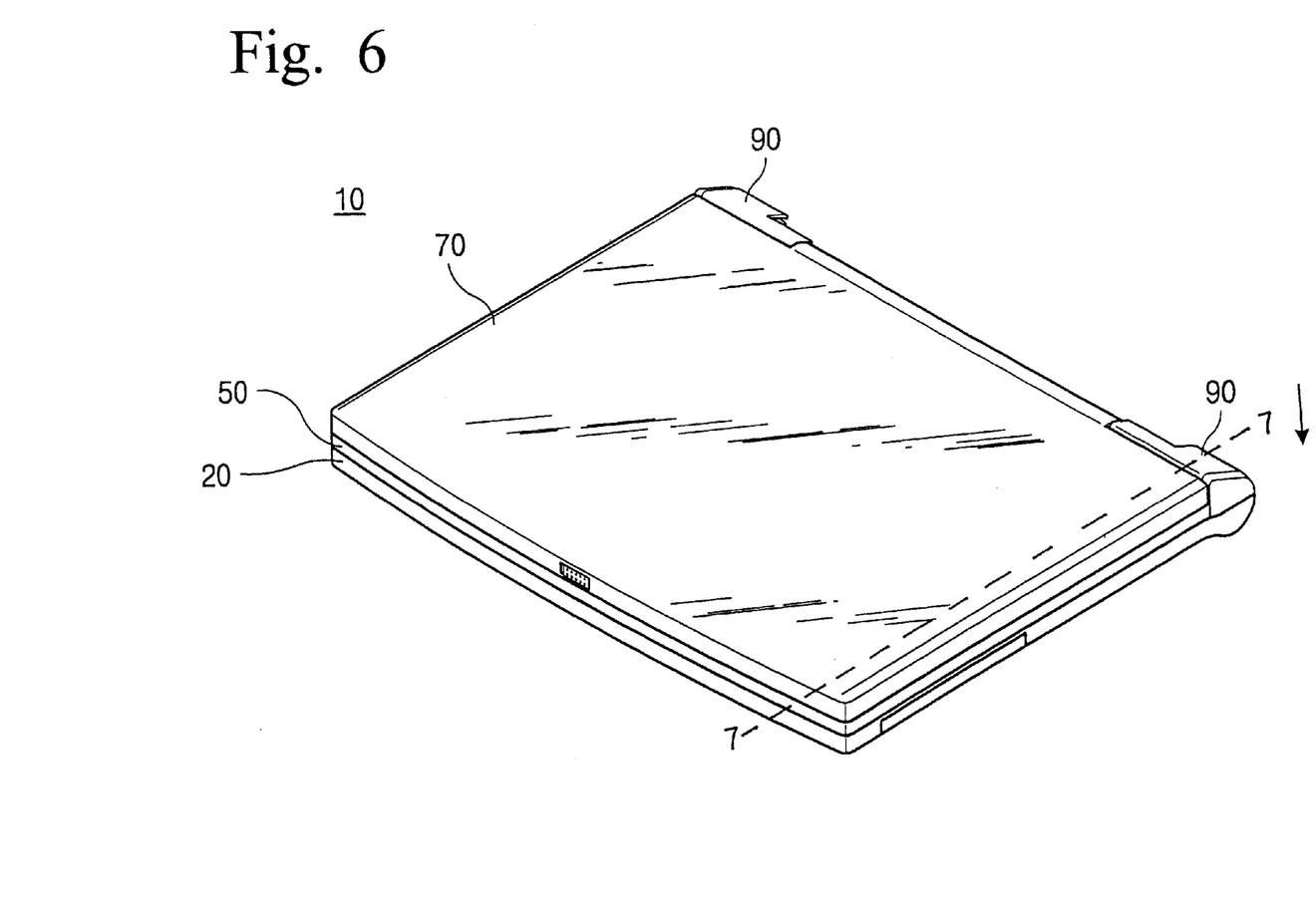

Referring to FIGS. 3–7, the assembly process of the portable computer is easily performed according to the embodiment of the present invention. The total assembly process is explained in more detail. At first, necessary electronic components of the each part are mounted on each element. Next, the printed circuit board 40 is mounted on the lower housing 20 and the holes 42 of the printed circuit board 40 is accorded with the hole 24 of the lower housing 22. The upper housing 50 is coupled to the lower housing 20 and in this state, the holes 52 formed on the upper housing 50 is accorded with the holes 24 of the lower housing 22 as shown in FIG. 4. The display panel 70 is coupled to the upper housing 50 and the hole 76 of the hinge plate 72 is agreed with the hole 24 of the lower housing 22 as shown in FIG. 5. The caps 90 are mounted on the upper housing 50 to be covered with the hinge shaft 74 and the hinge plate 72. Finally, as shown in FIG. 7, the screws 110 are inserted into the bottom bosses 22 from the outside of the lower housing 20. The inserted screws 110 are passed through holes of the printed circuit board 40, the upper housing 50 and the hinge plate 72, then is coupled to the cap boss 92 of the caps 90.

In accordance with the present invention, it is possible that the assembly process of the portable computer is easily and fast performed. And additionally, it is possible to save the internal space of the portable computer.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A portable computer, comprising:
   a housing forming a main body with a bottom portion and a top portion, said housing accommodating electronic components for performing functions of said portable computer;
   at least one boss forming on said bottom portion of said housing, said boss extending upward and having a hole;
   said top portion of said housing coupled to said bottom portion of said housing and having at least one hole aligned with the hole of said boss of said bottom portion, said top portion accommodating an input device for said portable computer;
   a plate having a hole aligned with the hole of said top portion;
   a cover incorporating a display screen providing variable video display;
   a pivot shaft rotatably inserted through a rear edge of said cover and a rear edge of said top portion of said housing, said pivot shaft pivotally attaching said cover with said top portion and providing at least one hole aligned with a hole of said boss of said bottom portion;
   at least one cap coupling to the top housing to cover said pivot shaft and said plate, said cap having at least one boss aligned with the hole of said boss of bottom portion; and
   at least one fastener inserting from an outside of said bottom portion of said housing and passing through said boss of said bottom portion, through the hole of said top portion and through the hole of said plate, coupling to said boss of said cap.

2. The portable computer of claim 1, further comprising a printed circuit board having a hole aligned with the hole of said boss of said bottom portion, said circuit board being between said bottom portion and said top portion, said fastener inserting through the hole of said printed circuit.

3. A portable computer, comprising:
   a housing forming a main body with a bottom portion and a top portion, said housing accommodating electronic components for performing functions of said portable computer;
   at least one boss forming on said bottom portion of said housing, said boss extending upward and having a hole;
   said top portion of said housing coupled to said bottom portion of said housing and having at least one hole aligned with the hole of said boss of said bottom portion, said top portion accommodating an input device for said portable computer;
   a plate having a hole aligned with the hole of said top portion;
   a cover incorporating a display screen providing variable video display;
   a pivot shaft rotatable inserted through a rear edge of said cover and a rear edge of said top portion of said housing, said pivot shaft pivotally attaching said cover with said top portion and providing at least one hole aligned with a hole of said boss of said bottom portion;
   at least one cap coupling to the top housing to cover said pivot shaft and said plate, said cap having at least one boss aligned with the hole of said boss of bottom portion, said cap including a first time with a detent at an end portion of said tine spaced apart from said boss of said cap and a second tine with a detent formed perpendicular to the first tine and spaced apart from said boss of said cap;
   at least one fastener inserting from an outside of said bottom portion of said housing and passing through said boss of said bottom portion, through the hole of said top portion and through the hole of said plate, coupling to said boss of said cap; and
   a printed circuit board having a hole aligned with the hole of said boss of said bottom portion, said circuit board being between said bottom portion and said top portion, said fastener inserting through the hole of said printed circuit.

4. The portable computer of claim 3, wherein said top portion of said housing includes a first aperture and second aperture spaced apart, said first tine coupling with the first aperture and the second tine coupling with the second aperture accommodating securing said cap on said top portion of said housing.

5. The portable computer of claim 1, wherein the interior portion of said boss of said cap forming the hole is metal, the interior portion made of metal securely coupling said fastener to said boss of said cap.

6. The portable computer of claim 1, said portable computer corresponding to a laptop computer, said laptop computer fitting on a user's lap while being operated by the user and including, in a single unit, a keyboard, liquid crystal display screen, microprocessor, and a rechargeable battery.

7. The portable computer of claim 1, said portable computer corresponding to a palmtop computer, said palmtop computer fitting on a user's hand while being operated by the user and including, in a single unit, a keyboard, liquid crystal display screen, microprocessor, and a battery.

8. The portable computer of claim 1, said portable computer corresponding to a personal digital assistant, said personal digital assistant fitting on a user's hand while being operated by the user and including, in a single unit, an input device, liquid crystal display screen, microprocessor, and a battery, said personal digital assistant having at least a database for names and addresses.

9. A method, comprising the steps of:
   forming at least one boss with a hole on a bottom portion of a housing, said housing accomodating electronic components performing functions of a portable computer;
   forming at least one hole on a circuit board aligned with the hole of said boss of said bottom portion, said circuit board accommodating a microprocessor of said portable computer;
   forming at least one hole on a top portion of said housing aligned with the hole of said circuit board, said top portion accommodating a keyboard assembly with manually manipulating keys used to input data into said portable computer;

aligning at least one hole of a plate with the holes of said bottom portion, said circuit board and said top portion, said plate having protrusions at a corner;

pivotally attaching a cover with said top portion by inserting a pivot shaft through a rear edge of a cover and a through a rear edge of said top portion of said housing, said cover accommodating a display screen providing variable video display;

covering said pivot shaft and said plate by coupling a cap with said rear edge of said top portion, said cap having a boss formed with a hole aligned with the hole of said lower portion; and inserting at least one fastener from outside of said bottom portion of said housing and passing through said boss of said bottom portion, through the hole of said circuit board, through the hole of said top portion, and through the hole of said plate, coupling to said boss of said cap.

10. The method of claim 9, wherein said cap includes a first tine with a detent at an end portion of said tine spaced apart from said boss of said cap and a second tine with a detent formed perpendicular to the first tine and spaced apart from said boss of said cap.

11. The method of claim 10, wherein said top portion of said housing includes a first aperture and second aperture spaced apart, further comprising the step of securing said cap on said top portion of said housing by coupling said first tine with the first aperture and said second tine with the second aperture.

12. The portable computer of claim 9, said portable computer corresponding to a notebook computer, said notebook computer fitting on a user's lap while being operated by the user and including, in a single unit, a keyboard, liquid crystal display screen, microprocessor, and a rechargeable battery.

13. The portable computer of claim 9, said portable computer corresponding to a palmtop computer, said palmtop computer fitting on a user's hand while being operated by the user and including, in a single unit, a keyboard, liquid crystal display screen, microprocessor, and a battery.

14. The portable computer of claim 9, said portable computer corresponding to a personal digital assistant, said personal digital assistant fitting on a user's hand while being operated by the user and including, in a single unit, an input device, liquid crystal display screen, microprocessor, and a battery, said personal digital assistant having at least a database for names and addresses.

15. A portable computer, comprising:

a housing forming a main body with a bottom portion and a top portion, said housing accommodating electronic components performing functions of said portable computer;

a boss forming on said bottom portion of said housing, said boss having a hole;

said top portion of said housing coupled to said bottom portion of said housing and having one hole aligned with the hole of said boss of said bottom portion, said top portion accommodating an input device for said portable computer;

a plate having a hole aligned with the hole of said top portion;

a cover incorporating a display screen providing variable video display;

a pivot shaft rotatably inserted through a rear edge of said cover and a rear edge of said top portion of said housing, said pivot shaft pivotally attaching said cover with said top portion and providing one hole aligned with a hole of said boss of said bottom portion;

a cap coupling to the top housing to cover said pivot shaft and said plate, said cap having a boss aligned with the hole of said boss of said bottom portion, said cap including a first tine with a detent at an end portion of said tine spaced apart from said boss of said cap and a second tine with a detent formed perpendicular to the first tine and spaced apart from said boss of said cap; and a fastener inserting from an outside of said bottom portion of said housing and passing through said boss of said bottom portion, through the hole of said top portion and through the hole of said plate, coupling to said boss of said cap.

16. The portable computer of claim 15, further comprising a printed circuit board having a hole aligned with the hole of said boss of said bottom portion, said circuit board being between said bottom portion and said top portion, said fastener inserting through the hole of said printed circuit.

17. The portable computer of claim 16, with said boss extending upward from said bottom portion.

18. The portable computer of claim 17, with said top portion of said housing including a first aperture and second aperture spaced apart, said first tine coupling with the first aperture and said second tine coupling with the second aperture accommodating securing said cap on said top portion of said housing.

19. The portable computer of claim 18, said portable computer corresponding to a laptop computer, said laptop computer fitting on a user's lap while being operated by the user and including, in a single unit, a keyboard, liquid crystal display screen, microprocessor, and a rechargeable battery.

20. The portable computer of claim 18, said portable computer corresponding to a personal digital assistant, said personal digital assistant fitting on a user's hand while being operated by the user and including, in a single unit, an input device, liquid crystal display screen, microprocessor, and a battery, said personal digital assistant having at least a database for names and addresses.

* * * * *